(12) United States Patent
Suto et al.

(10) Patent No.: US 11,804,593 B2
(45) Date of Patent: Oct. 31, 2023

(54) CARBONACEOUS SUBSTANCE-COATED GRAPHITE PARTICLES, NEGATIVE ELECTRODE FOR LITHIUM ION SECONDARY BATTERY AND LITHIUM ION SECONDARY BATTERY

(71) Applicants: JFE CHEMICAL CORPORATION, Tokyo (JP); JFE STEEL CORPORATION, Tokyo (JP)

(72) Inventors: Mikito Suto, Tokyo (JP); Yusuke Fushiwaki, Tokyo (JP); Akira Matsuzaki, Tokyo (JP); Ryota Yamaji, Tokyo (JP); Ryuta Haga, Tokyo (JP)

(73) Assignees: JFE Chemical Corporation, Tokyo (JP); JFE Steel Corporation, Tokyo (JP)

(*) Notice: Subject to any disclaimer, the term of this patent is extended or adjusted under 35 U.S.C. 154(b) by 0 days.

(21) Appl. No.: 18/031,056

(22) PCT Filed: Jul. 28, 2022

(86) PCT No.: PCT/JP2022/029179
§ 371 (c)(1),
(2) Date: Apr. 10, 2023

(87) PCT Pub. No.: WO2023/021959
PCT Pub. Date: Feb. 23, 2023

(65) Prior Publication Data
US 2023/0290933 A1    Sep. 14, 2023

(30) Foreign Application Priority Data

Aug. 17, 2021    (JP) ................................ 2021-132738

(51) Int. Cl.
*H01M 4/36*    (2006.01)
*H01M 10/0525*    (2010.01)
(Continued)

(52) U.S. Cl.
CPC ............. *H01M 4/366* (2013.01); *C01B 32/21* (2017.08); *H01M 4/133* (2013.01); *H01M 4/587* (2013.01);
(Continued)

(58) Field of Classification Search
CPC ....... H01M 4/366; H01M 4/133; H01M 4/587
See application file for complete search history.

(56) References Cited

U.S. PATENT DOCUMENTS

| 2012/0219863 | A1 | 8/2012 | Takahashi et al. |
| 2019/0237764 | A1 | 8/2019 | Takano et al. |
| 2021/0408521 | A1* | 12/2021 | Haga ..................... H01M 4/625 |

FOREIGN PATENT DOCUMENTS

| CN | 107534148 A | 1/2018 |
| JP | 1012241 A | 1/1998 |

(Continued)

OTHER PUBLICATIONS

Taiwanese Office Action with Search Report for Taiwanese Application No. 111130737, dated Apr. 21, 2023, 7 pages.
(Continued)

*Primary Examiner* — Nathanael T Zemui
(74) *Attorney, Agent, or Firm* — RatnerPrestia

(57) ABSTRACT

Provided are carbonaceous substance-coated graphite particles that include: graphite particles; and carbonaceous coatings covering at least part of surfaces of the graphite particles, the carbonaceous substance-coated graphite particles have a maximum particle diameter of 30.0 to 90.0 μm, a pore volume $V_s$ of pores with a pore size of 7.8 to 36.0 nm is 0.009 to 0.164 cm³/g, and in a pore size distribution graph with the pore size being plotted on a horizontal axis and a dV/dP value obtained by differentiating the pore volume
(Continued)

with the pore size being plotted on a vertical axis, a pore size $P_{max}$ with which the dV/dP value is maximized is 2.5 to 5.5 nm.

8 Claims, 7 Drawing Sheets

(51) Int. Cl.
    *H01M 4/133*     (2010.01)
    *H01M 4/587*     (2010.01)
    *C01B 32/21*     (2017.01)
    *H01M 4/02*     (2006.01)

(52) U.S. Cl.
    CPC ..... *H01M 10/0525* (2013.01); *C01P 2004/32* (2013.01); *C01P 2004/61* (2013.01); *C01P 2004/62* (2013.01); *C01P 2004/84* (2013.01); *C01P 2006/14* (2013.01); *C01P 2006/16* (2013.01); *C01P 2006/40* (2013.01); *H01M 2004/021* (2013.01)

(56) References Cited

FOREIGN PATENT DOCUMENTS

| | | |
|---|---|---|
| JP | 2011029408 A | 2/2011 |
| JP | 2016004691 A | 1/2016 |
| JP | 2016105396 A | 6/2016 |
| JP | 2019019048 A | 2/2019 |
| JP | 2021138810 A | 9/2021 |
| TW | 201622217 A | 6/2016 |
| WO | 2010013487 A1 | 2/2010 |
| WO | 2011052452 A1 | 5/2011 |
| WO | 2013125710 A1 | 8/2013 |
| WO | 2016031854 A1 | 3/2016 |
| WO | 2016194355 A1 | 12/2016 |
| WO | 2018043375 A1 | 3/2018 |

OTHER PUBLICATIONS

International Search Report and Written Opinion for International Application No. PCT/JP2022/029179, with English translation, dated Sep. 20, 2022, 22 pages.
Korean Office Action for Korean Application No. 10-2023-7011664, dated Jul. 24, 2023 with Concise Statement of Relevance of Office Action, 4 pages.

* cited by examiner

CARBONACEOUS SUBSTANCE-COATED GRAPHITE PARTICLES, NEGATIVE ELECTRODE FOR LITHIUM ION SECONDARY BATTERY AND LITHIUM ION SECONDARY BATTERY

CROSS REFERENCE TO RELATED APPLICATIONS

This is the U.S. National Phase application of PCT/JP2022/029179, filed Jul. 28, 2022, which claims priority to Japanese Patent Application No. 2021-132738, filed Aug. 17, 2021, the disclosures of these applications being incorporated herein by reference in their entireties for all purposes.

FIELD OF THE INVENTION

The present invention relates to carbonaceous substance-coated graphite particles, a negative electrode for a lithium ion secondary battery, and a lithium ion secondary battery.

BACKGROUND OF THE INVENTION

Conventionally, graphite may be used as a negative electrode material for a lithium ion secondary battery.

Patent literature 1 discloses "a method for producing a carbon material for a negative electrode active material including: a coating step of mixing graphite powder and a solid novolac resin, thereafter softening the novolac resin and applying a shear force to coat the graphite powder with the novolac resin, thereby forming granulated powder; a heat treatment step of subjecting the granulated powder to heat treatment in an oxygen-containing atmosphere to obtain heat-treated powder; and a baking step of baking the heat-treated powder in an inert gas atmosphere, thereby obtaining a carbon material for a negative electrode active material" (claim 1).

PATENT LITERATURE

Patent Literature 1: JP 2016-4691 A

SUMMARY OF THE INVENTION

The present inventors used carbonaceous substance-coated graphite particles produced by a conventional method as a negative electrode material for a lithium ion secondary battery. As a result, it was found that the battery properties (output characteristics) were insufficient in some cases.

Accordingly, aspects of the present invention have an object to provide carbonaceous substance-coated graphite particles that exhibit excellent output characteristics when used as a negative electrode material for a lithium ion secondary battery.

The present inventors found, through an earnest study, that employing the configuration described below enables the achievement of the above-mentioned object, and aspects of the invention have been completed.

Specifically, aspects of the present invention include the following [1] to [6].

[1] Carbonaceous substance-coated graphite particles comprising: graphite particles; and carbonaceous coatings covering at least part of surfaces of the graphite particles, wherein the carbonaceous substance-coated graphite particles have a maximum particle diameter of 30.0 to 90.0 μm, a pore volume $V_s$ of pores with a pore size of 7.8 to 36.0 nm is 0.009 to 0.164 cm$^3$/g, and in a pore size distribution graph with the pore size being plotted on a horizontal axis and a dV/dP value obtained by differentiating the pore volume with the pore size being plotted on a vertical axis, a pore size $P_{max}$ with which the dV/dP value is maximized is 2.5 to 5.5 nm.

[2] The carbonaceous substance-coated graphite particles according to [1], wherein in a particle size distribution of primary particles that is obtained using X-ray computed tomography, a volume ratio of primary particles with an equivalent spherical diameter of not more than 0.8 μm is 3.0 to 21.0%, and in a particle shape distribution of secondary particles that is obtained using X-ray computed tomography, a volume ratio of rod-shaped secondary particles is 2.6 to 65.0%.

[3] The carbonaceous substance-coated graphite particles according to [1] or [2], wherein an amount of the carbonaceous coatings is 0.1 to 15.0 parts by mass with respect to 100 parts by mass of the graphite particles.

[4] The carbonaceous substance-coated graphite particles according to any one of [1] to [3], wherein the carbonaceous substance-coated graphite particles are used as a negative electrode material for a lithium ion secondary battery.

[5] A negative electrode for a lithium ion secondary battery containing the carbonaceous substance-coated graphite particles according to any one of [1] to [3].

[6] A lithium ion secondary battery including the negative electrode according to [5].

According to aspects of the invention, it is possible to provide carbonaceous substance-coated graphite particles that exhibit excellent output characteristics when used as a negative electrode material for a lithium ion secondary battery.

DETAILED DESCRIPTION OF EMBODIMENTS OF THE INVENTION

Figure 1A:
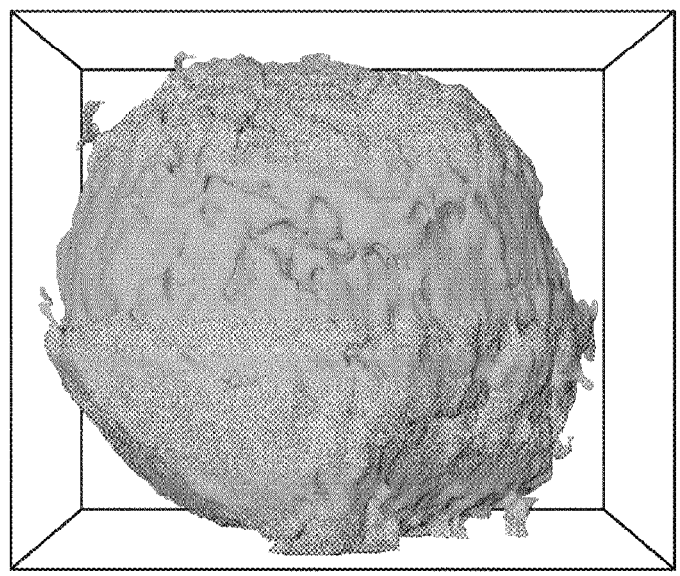
FIG. 1A is a three-dimensional image of a spherical particle.
Figure 1B:
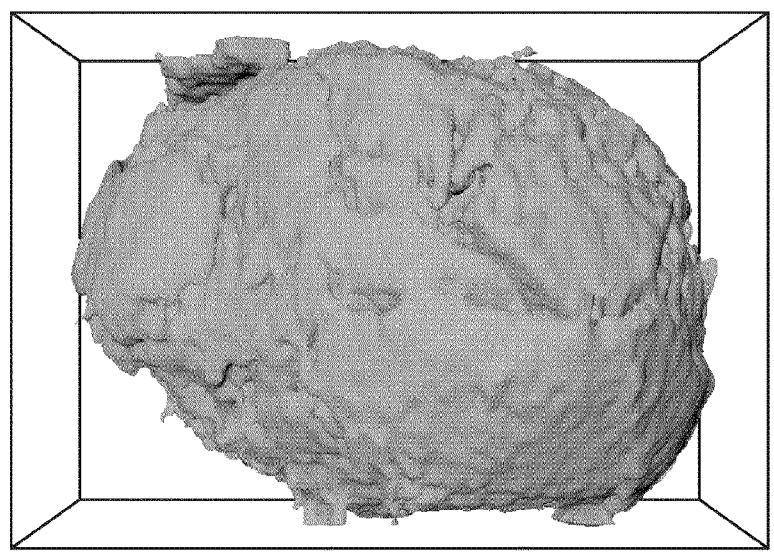
FIG. 1B is a three-dimensional image of the spherical particle observed from a different angle from FIG. 1A.
Figure 1C:
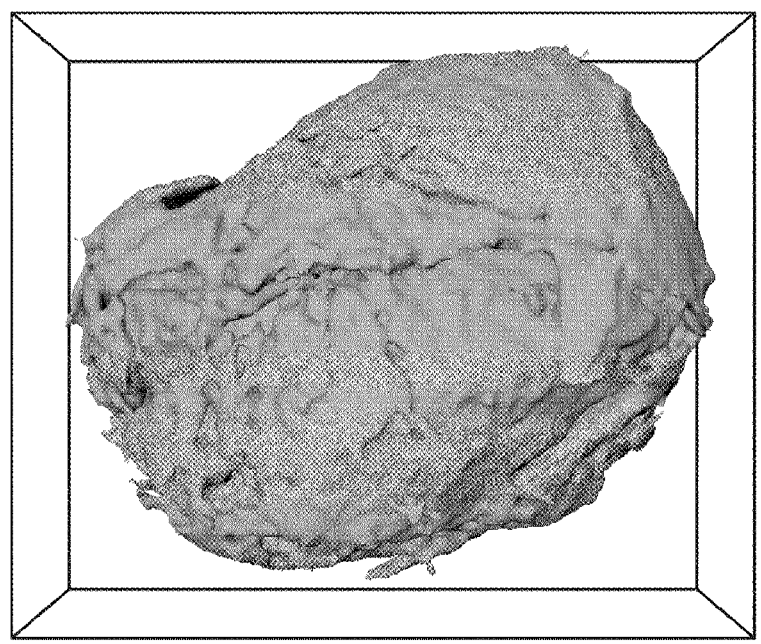
FIG. 1C is a three-dimensional image of the spherical particle observed from a different angle from FIGS. 1A and 1B.
Figure 1D:
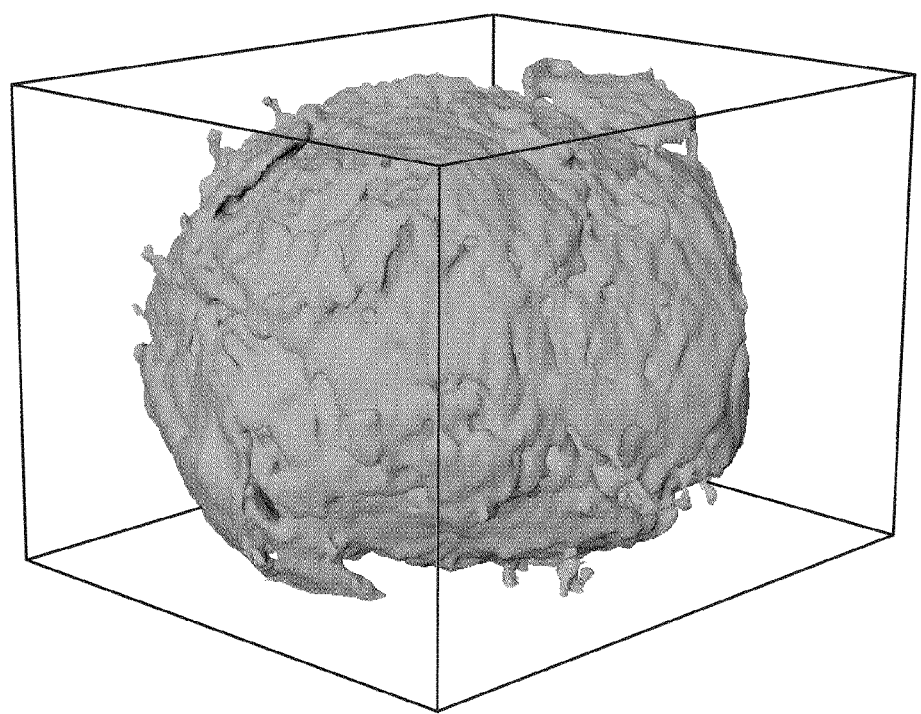
FIG. 1D is a three-dimensional image of the spherical particle observed from a different angle from FIGS. 1A, 1B, and 1C.
Figure 2A:
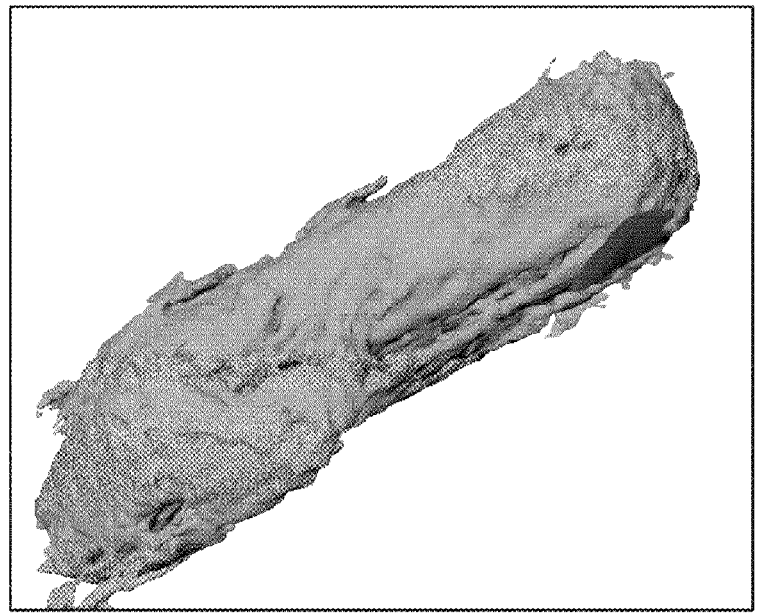
FIG. 2A is a three-dimensional image of a rod-shaped particle.
Figure 2B:
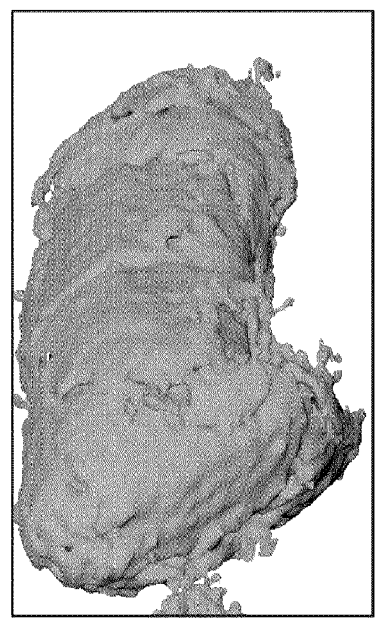
FIG. 2B is a three-dimensional image of the rod-shaped particle observed from a different angle from FIG. 2A.
Figure 2C:
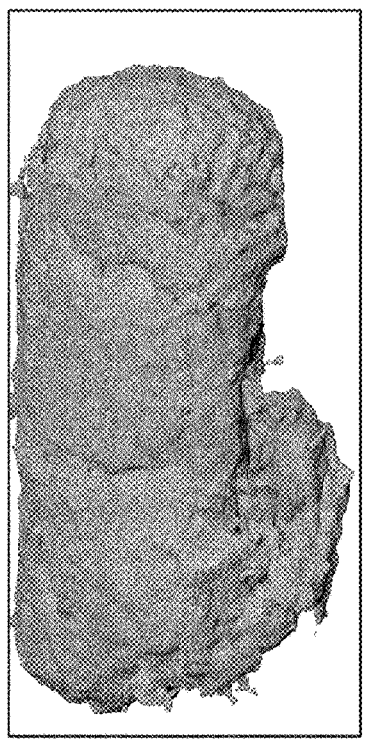
FIG. 2C is a three-dimensional image of the rod-shaped particle observed from a different angle from FIGS. 2A and 2B.
Figure 2D:
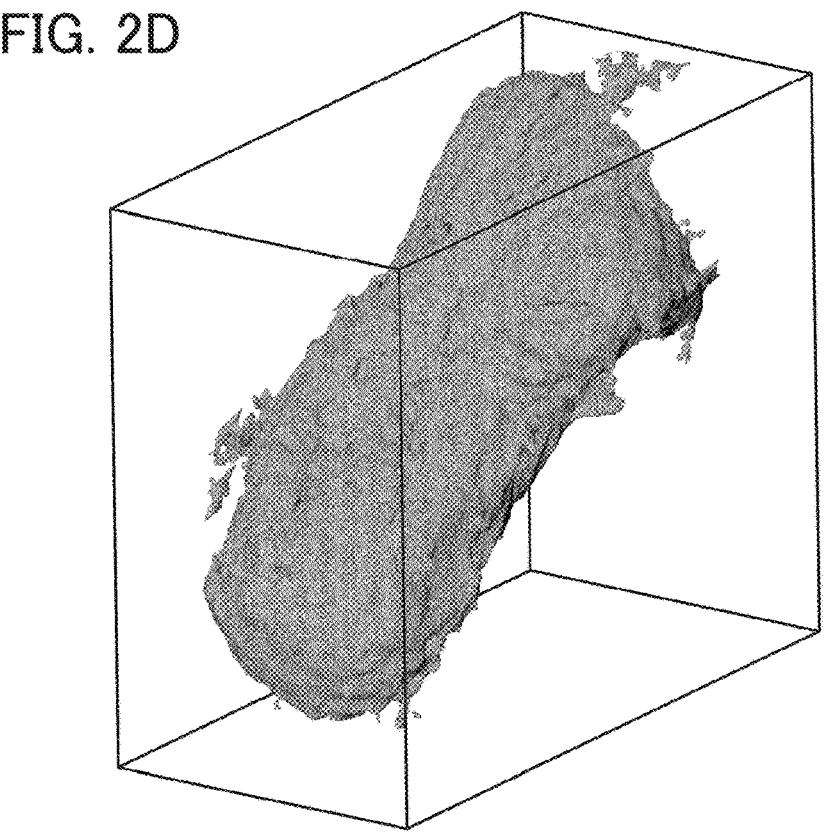
FIG. 2D is a three-dimensional image of the rod-shaped particle observed from a different angle from FIGS. 2A, 2B, and 2C.
Figure 3A:
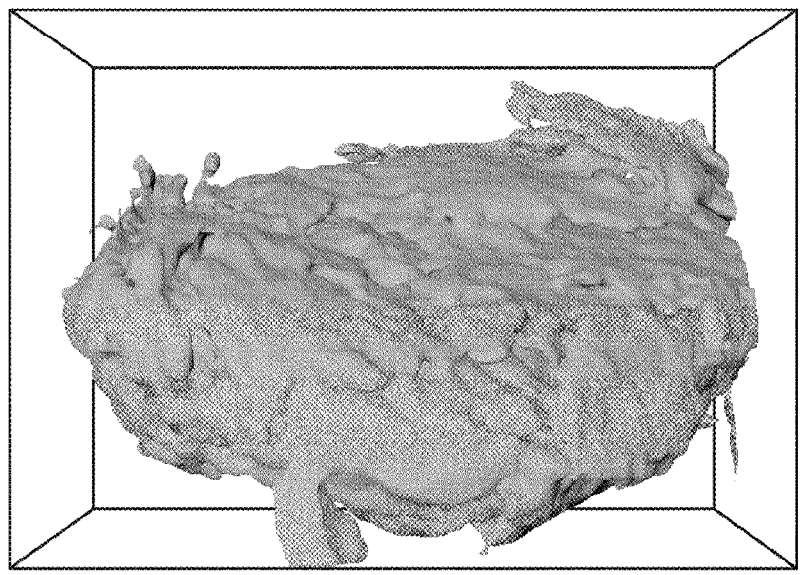
FIG. 3A is a three-dimensional image of another secondary particle.
Figure 3B:
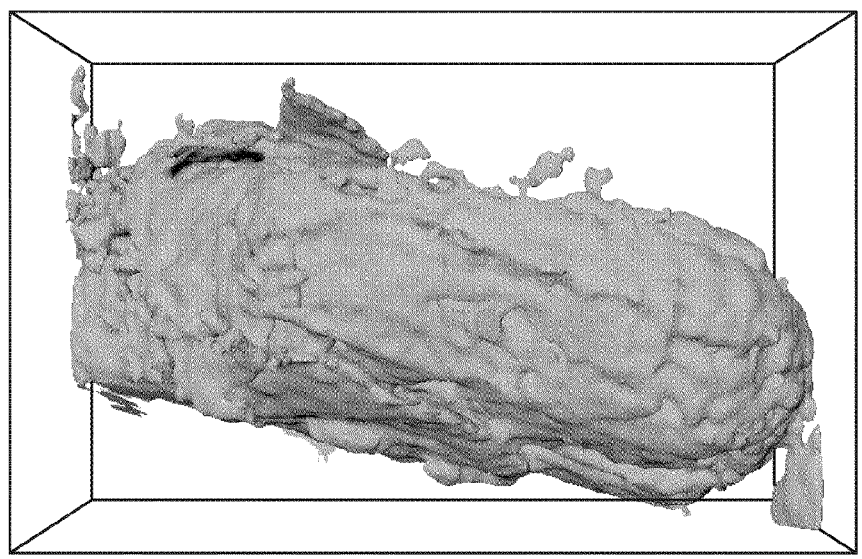
FIG. 3B is a three-dimensional image of the other secondary particle observed from a different angle from FIG. 3A.
Figure 3C:
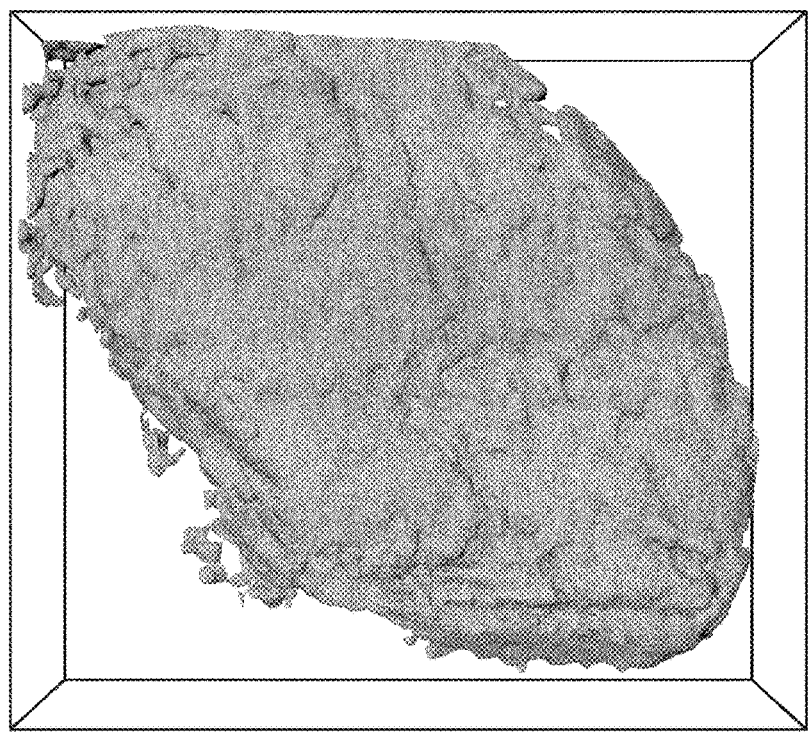
FIG. 3C is a three-dimensional image of the other secondary particle observed from a different angle from FIGS. 3A and 3B.
Figure 3D:
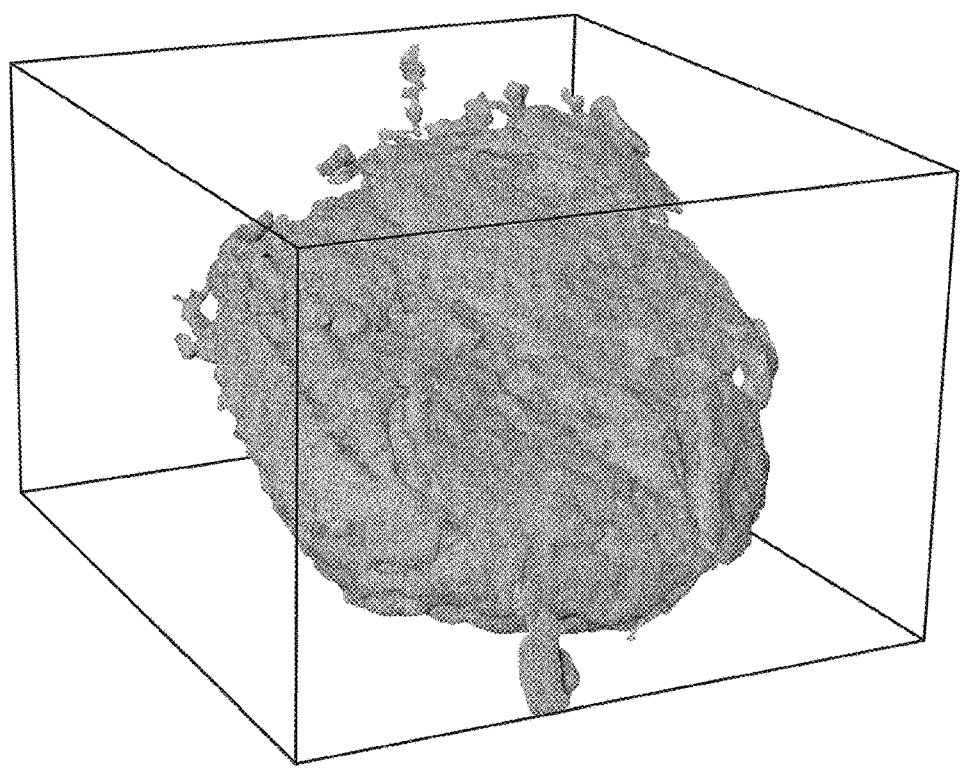
FIG. 3D is a three-dimensional image of the other secondary particle observed from a different angle from FIGS. 3A, 3B, and 3C.

In the description, a range expressed using the form of "(numeral) to (another numeral)" should read as a range including both ends defined by the numerals. For example, a range expressed as "A to B" includes A and B.

[Carbonaceous Substance-Coated Graphite Particles]

Carbonaceous substance-coated graphite particles according to aspects of the present invention include graphite particles and carbonaceous coatings covering at least part of surfaces of the graphite particles, wherein a maximum particle diameter is 30.0 to 90.0 μm, a pore volume $V_s$ of pores with a pore size of 7.8 to 36.0 nm is 0.009 to 0.164 cm$^3$/g, and in a pore size distribution graph with a pore size being plotted on a horizontal axis and a dV/dP value obtained by differentiating the pore volume by the pore size being plotted on a vertical axis, a pore size $P_{max}$ with which the dV/dP value is maximized is 2.5 to 5.5 nm.

When the carbonaceous substance-coated graphite particles according to aspects of the invention are used as a negative electrode material for a lithium ion secondary battery, output characteristics are excellent.

<Maximum Particle Diameter>

The maximum particle diameter of the carbonaceous substance-coated graphite particles according to aspects of the invention is not more than 90.0 μm because a reaction with an electrolyte is suppressed, leading to excellent output characteristics, and is preferably not more than 80.0 μm, more preferably not more than 70.0 μm, and further preferably not more than 65.0 μm because the foregoing effect is more excellent.

On the other hand, because of the similar reason, the maximum particle diameter is not less than 30.0 μm, preferably not less than 50.0 μm, and more preferably not less than 60.0 μm.

The maximum particle diameter is the largest value of the particle size distribution determined using a laser diffraction particle size distribution analyzer (LMS2000e manufactured by Seishin Enterprise Co., Ltd.).

<Pore Volume $V_s$>

As an index correlating with output characteristics when the carbonaceous substance-coated graphite particles are used, the inventors of the present invention focused on the pore volume determined from the nitrogen adsorption isotherm through the density functional theory (DFT) method.

Then, the inventors found out that the pore volume of pores with a pore size of 7.8 to 36.0 nm serves as a good index correlating with output characteristics.

Specifically, the pore volume $V_s$ of pores with a pore size of 7.8 to 36.0 nm of the carbonaceous substance-coated graphite particles according to aspects of the invention is not less than 0.009 cm$^3$/g, preferably not less than 0.010 cm$^3$/g, and more preferably not less than 0.030 cm$^3$/g because output characteristics are more excellent.

Because of the similar reason, the carbonaceous substance-coated graphite particles according to aspects of the invention have the pore volume $V_s$ of not more than 0.164 cm$^3$/g, preferably not more than 0.160 cm$^3$/g, more preferably not more than 0.158 cm$^3$/g, further preferably not more than 0.100 cm$^3$/g, and particularly preferably not more than 0.050 cm$^3$/g.

The pore volume is measured through the DFT method according to JIS Z 8831-2 (Analysis of mesopores and macropores by gas adsorption) and JIS Z 8831-3 (Analysis of micropores by gas adsorption). The pore volume measurement is started from a relative pressure of 5×10$^{-2}$ Pa.

<Pore Size $P_{max}$>

The inventors further found out that pores with a pore size of less than 7.8 nm are derived from amorphous carbon, and in the pore size distribution graph with a pore size being plotted on a horizontal axis and a dV/dP value obtained by differentiating the pore volume by the pore size being plotted on a vertical axis, the pore size $P_{max}$ with which the dV/dP value is maximized serves as a good index correlating with output characteristics.

Specifically, the pore size $P_{max}$ of the carbonaceous substance-coated graphite particles according to aspects of the invention is not more than 5.5 nm, and preferably not more than 4.5 nm because output characteristics are more excellent.

Because of the similar reason, the carbonaceous substance-coated graphite particles according to aspects of the invention have the pore size $P_{max}$ of not less than 2.5 nm, and preferably not less than 3.5 nm.

The pore size distribution is determined using a fully automatic gas adsorption analyzer As-iQ (manufactured by Quantachrome Instruments). Specifically, the carbonaceous substance-coated graphite particles having undergone pretreatment of vacuum-deaeration in a measuring cell at 300° C. for 2 hours are subjected to adsorption isotherm measurement under the following conditions.

Figure 5:
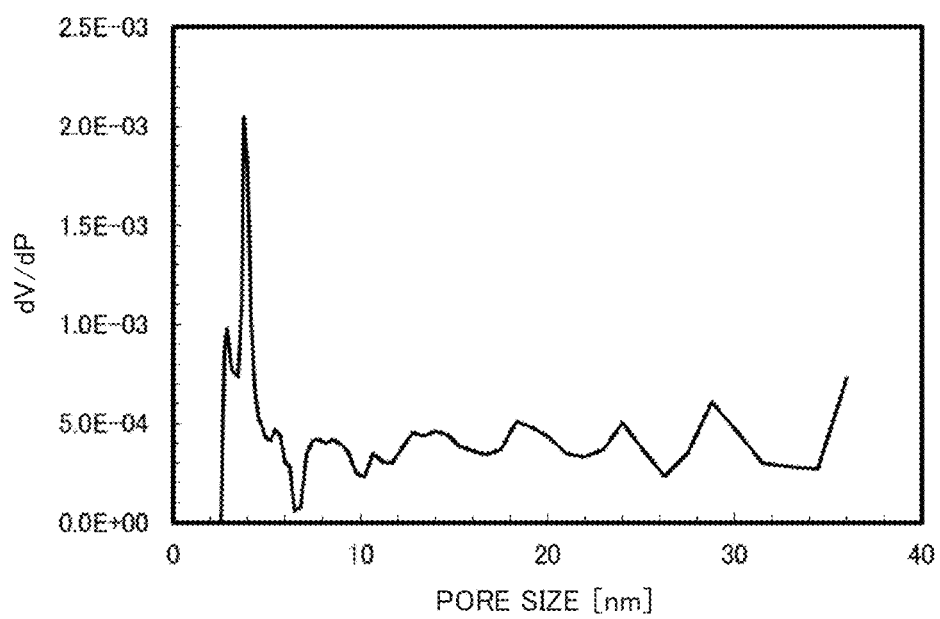
FIG. 5 is an example of a pore size distribution graph.

Adsorption gas: nitrogen gas
Measurement temperature: 77.3K
Cell size: pellet cell (1.5 cm$^3$)
Measurement relative pressure: 1×10$^{-2}$ to 1 Pa Assuming that the pore shape is a slit pore, the obtained adsorption isotherm is fitted through the non-local density functional theory (NLDFT) method. Accordingly, the pore size P (unit: nm) and the pore volume V (unit: cm$^3$/g) for each pore size P are calculated, and the pore size distribution graph with the pore size being plotted on a horizontal axis and the value (dV/dP) obtained by differentiating the pore volume with the pore size being plotted on a vertical axis is obtained. FIG. 5 shows an example of the pore size distribution graph.

<Volume Ratio of Fine Grains>

The carbonaceous substance-coated graphite particles according to aspects of the invention have, in the particle size distribution of the primary particles obtained using X-ray computed tomography, the volume ratio of the primary particles with the equivalent spherical diameter of not more than 0.8 μm (also called "fine grains" for convenience) of preferably 3.0 to 21.0%. With this configuration, output characteristics are more excellent.

Because output characteristics are further excellent, the volume ratio of the fine grains is more preferably not more than 18.0%, and further preferably not more than 10.0%.

Meanwhile, because of the similar reason, the volume ratio of the fine grains is more preferably not less than 3.2%, and further preferably not less than 3.5%.

<<Particle Size Distribution of Primary Particles>>

A method of obtaining a particle size distribution of the primary particles constituting the carbonaceous substance-coated graphite particles is described.

In order to find sizes of the primary particles, it is necessary to visualize the carbonaceous substance-coated graphite particles with a high resolution in a non-destructive manner. Hence, the carbonaceous substance-coated graphite particles are observed with X-ray computed tomography using a radiation source. More specifically, imaging X-ray computed tomography is performed using SPring-8 beamline (BL24XU) under the following conditions.

X-ray energy: 8 keV
Image resolution: 1,248 (H)×2,048 (W) pixels
Effective pixel size: 68 nm/pixel
Exposure time: 0.5 seconds
Number of captured projection images: 1,200
Defocus: 0.3 mm The carbonaceous substance-coated graphite particles as a sample are charged into a quartz glass capillary (inner diameter: about 0.1 mm) and subjected to X-ray computed tomography.

After projection images of the carbonaceous substance-coated graphite particles are captured, a cross-sectional slice image is reconstructed. Subsequently, a watershed analysis function of a commercial image analysis software, ExFact VR (available from Nihon Visual Science, Inc.) is used to separate and individually recognize neighboring primary particles, and a volume of each primary particle is calculated. In addition, an equivalent spherical diameter of each primary particle is determined from the obtained volume. Data of each primary particle is plotted in a graph (horizontal axis: equivalent spherical diameter, vertical axis: volume ratio of each primary particle with respect to total volume), whereby the particle size distribution of the primary particles is obtained.

<Volume Ratio of Rod-Shaped Particles>

The carbonaceous substance-coated graphite particles according to aspects of the invention preferably have, in a particle shape distribution of secondary particles obtained using X-ray computed tomography, the volume ratio of rod-shaped secondary particles (also called "rod-shaped particles" for convenience) of 2.6 to 65.0%. With this configuration, output characteristics are more excellent.

Because output characteristics are further excellent, the volume ratio of the rod-shaped particles is more preferably not less than 5.0%, further preferably not less than 10.0%, further more preferably not less than 15.0%, particularly preferably not less than 20.0%, and most preferably not less than 35.0%.

On the other hand, because of the similar reason, the volume ratio of the rod-shaped particles is more preferably not more than 59.0%, further preferably not more than 55.0%, further more preferably not more than 50.0%, particularly preferably not more than 40.0%, and most preferably not more than 36.0%.

<<Particle Shape Distribution of Secondary Particles>>

A method of obtaining a particle shape distribution of the secondary particles constituting the carbonaceous substance-coated graphite particles is described.

In order to find shapes of the secondary particles, it is necessary to visualize the carbonaceous substance-coated graphite particles with a high resolution in a non-destructive manner. Hence, the carbonaceous substance-coated graphite particles are observed with X-ray computed tomography using a radiation source. More specifically, projection X-ray computed tomography is performed using SPring-8 beamline (BL24XU) under the following conditions.

X-ray energy: 20 keV
Image resolution: 2,048 (H)×2,048 (W) pixels
Effective pixel size: 325 nm/pixel
Exposure time: 0.1 seconds
Number of captured projection images: 1,800
Distance between sample and detector: 10 mm The carbonaceous substance-coated graphite particles as a sample are charged into a borosilicate glass capillary (inner diameter: about 0.6 mm) and subjected to X-ray computed tomography.

After projection images of the carbonaceous substance-coated graphite particles are captured, a cross-sectional slice image is reconstructed. Subsequently, a watershed analysis function of a commercial image analysis software, ExFact VR (available from Nihon Visual Science, Inc.) is used to separate and individually recognize neighboring secondary particles, and a volume of each secondary particle is calculated.

Next, for each secondary particle, three principal axes of inertia mutually perpendicular to one another are defined, and a barycentric moment of each of the axes is obtained. Among the three barycentric moments, the largest moment is determined as L, the smallest moment as S, and the intermediate moment as M. According to the following definitions, particle shapes of respective secondary particles are classified as the spherical shape, rod shape, and another shape.

Spherical shape: $S/L \geq 0.5$, and $M/L \geq 0.5$
Rod shape: $S/L < 0.5$, and $M/L < 0.5$ With respect to a total volume of secondary particles, a volume ratio of secondary particles classified as the spherical shape (spherical particles) and a volume ratio of secondary particles classified as the rod shape (rod-shaped particles) are determined. Accordingly, the shape distribution of the secondary particles is obtained.

Examples of three-dimensional images obtained by image analysis of the X-ray computed tomographic data of the secondary particles are shown.

FIGS. 1A to 1D are three-dimensional images of a spherical particle ($S/L=0.79$, $M/L=0.91$).

FIGS. 2A to 2D are three-dimensional images of a rod-shaped particle ($S/L=0.11$, $M/L=0.19$).

FIGS. 3A to 3D are three-dimensional images of another secondary particle (ellipsoidal particle) ($S/L=0.22$, $M/L=0.88$).

In FIGS. 1A to 1D, a single secondary particle is observed at different observation angles. The same applies to FIGS. 2A to 2D and FIGS. 3A to 3D.

<Amount of Carbonaceous Coatings>

An amount of carbonaceous coatings is correlated with the pore volume and is, for example, not less than 0.1 parts by mass, preferably not less than 0.3 pars by mass, more preferably not less than 0.5 parts by mass, further preferably not less than 1.5 part by mass, particularly preferably not less than 2.0 parts by mass, and most preferably not less than 4.0 parts by mass with respect to 100 parts by mass of graphite particles, because output characteristics are more excellent.

On the other hand, because of the similar reason, an amount of the carbonaceous coatings is preferably not more than 15.0 parts by mass, more preferably not more than 13.0 parts by mass, further preferably not more than 11.0 parts by mass, particularly preferably not more than 8.0 parts by mass, and most preferably not more than 6.0 parts by mass with respect to 100 parts by mass of graphite particles.

An amount of the carbonaceous coatings in the carbonaceous substance-coated graphite particles is determine as described below.

First, a residual carbon ratio of a precursor of the carbonaceous coatings (e.g., novolac-type phenolic resin to be described later) is determined. The residual carbon ratio is a ratio (unit: mass %) of a residual amount of the precursor to a charge amount thereof when the precursor alone is applied with the same heating history as that of the carbonaceous substance-coated graphite particles to form the carbonaceous coatings.

An amount of the carbonaceous coatings is determined based on the determined residual carbon ratio of the precursor and an amount of addition to be described later.

For instance, a case where an amount of the precursor having a residual carbon ratio of "34 mass %" to be added is "8.0 parts by mass" with respect to 100 parts by mass of graphite particles is discussed. In this case, an amount of the carbonaceous coatings in the carbonaceous substance-coated graphite particles to be obtained should be "2.7 parts by mass" (=8.0×0.34) with respect to 100 parts by mass of graphite particles.

[Method for Producing Carbonaceous Substance-Coated Graphite Particles]

Next, an exemplary method of producing the foregoing carbonaceous substance-coated graphite particles according to aspects of the invention (hereinafter, also referred to as simply "production method according to aspects of the invention") is described.

In the production method according to aspects of the invention, first, resin-adhered graphite particles are obtained by causing a novolac-type phenolic resin to adhere to graphite particles. The resin-adhered graphite particles are then heated in a non-oxidizing atmosphere at 900 to 1,500° C. to carbonize the novolac-type phenolic resin. Accordingly, at least part of surfaces of the graphite particles is covered by the carbonaceous coatings.

<Graphite Particles>

Graphite particles used in accordance with aspects of the invention are not particularly limited, and suitable examples thereof include graphite particles (spherically shaped graphite) obtained by processing a raw material into a spherical shape.

This raw material is graphite having a different shape from a spherical shape (including ellipsoidal shape), such as flake graphite. The graphite may be either of natural graphite and artificial graphite, while natural graphite is preferred because of high crystallinity or other reasons.

More specific examples of the method of processing the raw material into a spherical shape include a method in which the raw material is stirred in the presence of a granulation assisting agent such as an adhesive or a resin, a method in which a mechanical external force is applied to raw materials without use of a granulation assisting agent, and a method in which the both methods are combined.

Among these, the method in which a mechanical external force is applied to raw materials without use of a granulation assisting agent is preferred. This method is described below in more detail.

More specifically, a raw material (such as flake graphite) is pulverized and granulated through application of a mechanical external force using a pulverizing apparatus. Accordingly, the raw material is processed into a spherical shape to obtain spherically shaped graphite.

Examples of a pulverizing apparatus include a rotating ball mill, Opposed Jet Mill (manufactured by Hosokawa Micron Corporation), Current Jet (manufactured by Nisshin Engineering Inc.), Hybridization System (manufactured by Nara Machinery Co., Ltd.), CF mill (manufactured by UBE Corporation), MECHANO FUSION System (manufactured by Hosokawa Micron Corporation), and Theta Composer (manufactured by TOKUJU CORPORATION), and among these, Hybridization System (manufactured by Nara Machinery Co., Ltd.) is preferred.

In accordance with aspects of the invention, it is preferable that while a plurality of pulverizing apparatuses are installed in series, a raw material sequentially passes through the pulverizing apparatuses. In other words, the pulverizing apparatuses are preferably installed in series such that immediately after a raw material has passed through one of the pulverizing apparatuses, the raw material is pulverized and granulated in the next pulverizing apparatus.

<<Number of Pulverizing Apparatuses>>

Here, the number of pulverizing apparatuses is, for example, 2 or more, preferably 3 or more, more preferably 4 or more, further preferably 5 or more, and particularly preferably 6 or more.

Meanwhile, the number of pulverizing apparatuses is preferably 10 or less, more preferably 8 or less, and further preferably 7 or less.

<<Pulverizing Time>>

Time for pulverizing and granulating the raw material (called "pulverizing time" for convenience) in each pulverizing apparatus is preferably not less than 8 minutes/apparatus, more preferably not less than 13 minutes/apparatus, and further preferably not less than 18 minutes/apparatus.

Meanwhile, the pulverizing time in each pulverizing apparatus is preferably not more than 60 minutes/apparatus, more preferably not more than 50 minutes/apparatus, and further preferably not more than 40 minutes/apparatus.

<<Total Pulverizing Time>>

A product of the number of pulverizing apparatuses and the pulverizing time in each pulverizing apparatus (called "total pulverizing time" for convenience) is preferably not less than 30 minutes, more preferably not less than 50 minutes, and further preferably not less than 90 minutes.

Meanwhile, the total pulverizing time is preferably not more than 180 minutes, and more preferably not more than 160 minutes.

<<Circumferential Speed of Rotor>>

The pulverizing apparatus normally includes a rotor built therein.

The rotor in each pulverizing apparatus has a circumferential speed of preferably not less than 30 m/second, more preferably not less than 40 m/second, and further preferably not less than 60 m/second.

Meanwhile, the circumferential speed of the rotor in each pulverizing apparatus is preferably not more than 180 m/second, more preferably not more than 100 m/second, and further preferably not more than 80 m/second.

<<Total Pulverizing Time×Circumferential Speed of Rotor>>

A product (unit: m) of the total pulverizing time (unit: second) and the circumferential speed of the rotor (unit: m/second) is preferably not less than 75,000 m, more preferably not less than 80,000 m, and further preferably not less than 85,000 m.

Meanwhile, the product is preferably not more than 460,000 m, more preferably not more than 430,000 m, and further preferably not more than 400,000 m.

An amount of the raw material charged into each pulverizing apparatus is preferably smaller for easier application of a sheer fore and a compression force to the raw material.

<Novolac-Type Phenolic Resin>

The novolac-type phenolic resin used in accordance with aspects of the invention is preferably expressed by the following Formula (1).

[Chemical Formula 1]

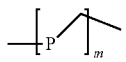

(1)

In Formula (1), P represents an arylene group having a hydroxy group, and m represents an integer of 1 or more.

An example of an arylene group having a hydroxy group represented by P in Formula (1) is a divalent group derived from a phenol (i.e., a residue from an aromatic ring constituting a phenol, from which two hydrogen atoms are removed).

While a phenol is not particularly limited, specific examples thereof include phenol; an alkyl-substituted phenol such as o-cresol, m-cresol, p-cresol, xylenol or p-t-butyl phenol; an aromatic-substituted phenol such as p-phenylphenol; a divalent phenol such as catechol or resorcinol; and naphthol such as α-naphthol or β-naphthol. Among these, phenol is preferred.

An integer of 1 or more represented by m in Formula (1) is not particularly limited and is appropriately selected depending on, for example, a weight average molecular weight (Mw) of the novolac-type phenolic resin expressed by Formula (1).

<<Weight Average Molecular Weight>>

The weight average molecular weight of the novolac-type phenolic resin (in terms of polystyrene) is preferably 500 to 100,000, more preferably 600 to 100,000, further preferably 700 to 80,000, and particularly preferably 1,000 to 50,000 because the carbonaceous substance-coated graphite particles according to aspects of the invention can be easily obtained.

The weight average molecular weight is determined by measurement using gel permeation chromatography (GPC) under the following conditions.

(Measurement Conditions)
Apparatus: "HLC-8220" manufactured by TOSOH Corporation
Detector: "UV-8220" manufactured by TOSOH Corporation, set at wavelength of 280 nm
Analysis column: "TSK-GEL Super HZ2000," "TSK-GEL Super HZ3000" and "TSK-GEL Super HZM-M" manufactured by TOSOH Corporation are each used
Eluting solvent: tetrahydrofuran
Column temperature: 40° C.

<Resin-Adhered Graphite Particles>

In the production method according to aspects of the invention, first, the novolac-type phenolic resin is caused to adhere to graphite particles. In this manner, obtained are resin-adhered graphite particles in which the novolac-type phenolic resin is adhered to surfaces of graphite particles.

<<Mixing>>

An example of a method for causing the novolac-type phenolic resin to adhere to graphite particles is a method involving mixing graphite particles with the novolac-type phenolic resin.

The mixing method is not particularly limited, and an example thereof is a method in which graphite particles and the novolac-type phenolic resin being in a powder form or having been heated and melted into a liquid form are mixed using a kneader or another apparatus. In this step, a liquid dispersant in which graphite particles are dispersed in a dispersion medium may be used. As a kneader, a pressure kneader or a two-roll mill, for example, may be used.

The novolac-type phenolic resin preferably has a powder form for the easier spread over surfaces of graphite particles. The average particle diameter ($D_{50}$) of the novolac-type phenolic resin in a powder form is not particularly limited and, for example, 1 to 50 μm.

<<Amount of Addition>>

An amount of the novolac-type phenolic resin to be added may vary depending on the residual carbon ratio of the novolac-type phenolic resin and is suitably exemplified by the following amounts.

In particular, an amount of the novolac-type phenolic resin to be added is preferably not less than 0.1 parts by mass, more preferably not less than 0.2 parts by mass, and further preferably not less than 0.5 parts by mass with respect to 100 parts by mass of graphite particles.

Meanwhile, an amount of the novolac-type phenolic resin to be added is preferably not more than 30.0 parts by mass, more preferably not more than 15.0 parts by mass, further preferably not more than 10.0 parts by mass, and particularly preferably not more than 5.0 parts by mass with respect to 100 parts by mass of graphite particles.

<Heating of Resin-Adhered Graphite Particles>

Next, the resin-adhered graphite particles are heated in a non-oxidizing atmosphere at 900 to 1,500° C. By this process, the novolac-type phenolic resin is carbonized to turn into a carbonaceous substance (carbonaceous coating). Accordingly, obtained are the carbonaceous substance-coated graphite particles in which at least part of surfaces of graphite particles is covered by the carbonaceous coatings.

Because the irreversible capacity of the carbonaceous coatings is prevented from increasing, the heating temperature is not lower than 900° C., preferably not lower than 950° C., and more preferably not lower than 1,000° C.

Meanwhile, because the crystallinity of the carbonaceous coatings improves, the heating temperature is not higher than 1,500° C., preferably not higher than 1,300° C., and more preferably not higher than 1,200° C.

The heating time is preferably not less than one hour and more preferably not less than two hours. The upper limit thereof is not particularly limited and is, for example, 30 hours.

The heating atmosphere is a non-oxidizing atmosphere. This is because the carbonaceous coatings would be burned and vanished in an oxidizing atmosphere. Examples of a non-oxidizing atmosphere include a nitrogen atmosphere, an argon atmosphere, a helium atmosphere, and a vacuum atmosphere. A substantially non-oxidizing atmosphere may be achieved by placing, for example, coke breeze which oxidizes by itself and thereby decreases an oxygen concentration in atmosphere.

Hereinbelow, the carbonaceous substance-coated graphite particles according to aspects of the invention may be referred to as "negative electrode material according to aspects of the invention."

[Negative Electrode for Lithium Ion Secondary Battery (Negative Electrode)]

A negative electrode for a lithium ion secondary battery according to aspects of the invention contains the negative electrode material according to aspects of the invention. The negative electrode for a lithium ion secondary battery is also simply referred to as "negative electrode."

The negative electrode according to aspects of the invention is prepared as with a normal negative electrode.

For preparation of the negative electrode, it is preferable to use a negative electrode mixture preliminarily prepared by adding a binder to the negative electrode material according to aspects of the invention. The negative electrode mixture may contain an active material or an electrically conductive material in addition to the negative electrode material according to aspects of the invention.

It is preferable that the binder is chemically and electrochemically stable against an electrolyte, and for the binder, use may be made of, for example, fluororesin such as polytetrafluoroethylene or polyvinylidene fluoride; resin such as polyethylene, polyvinyl alcohol, or styrene butadiene rubber; and carboxymethyl cellulose, while two or more of these can be used in combination.

The binder normally accounts for about 1 to 20 mass % of the total amount of the negative electrode mixture.

More specifically, first, the negative electrode material according to aspects of the invention is optionally adjusted to a desired particle size through classification or the like. Thereafter, the negative electrode material according to aspects of the invention is mixed with the binder, and the resulting mixture is dispersed in a solvent to prepare the negative electrode mixture in a paste form. Examples of the solvent include water, isopropyl alcohol, N-methylpyrrolidone, and dimethylformamide. In the mixing and dispersing processes, a known agitator, mixer, kneader or the like is used.

The prepared paste is applied on one or both of the surfaces of a current collector and dried. This process results in a negative electrode mixture layer (negative electrode) that is uniformly and firmly adhered to the current collector. The negative electrode mixture layer has a thickness of preferably 10 to 200 μm and more preferably 20 to 100 μm.

After the negative electrode mixture layer is formed, compression bonding such as press pressurization is performed, whereby the adhesion strength of the negative electrode mixture layer (negative electrode) to the current collector can be further improved.

The shape of the current collector is not particularly limited, and examples thereof include a foil-like shape, a mesh shape, and a net-like shape such as an expanded metal shape. The material of the current collector is preferably copper, stainless steel, nickel or the like. The current collector preferably has a thickness of about 5 to 20 μm in a case of a foil-like shape.

<Coated Electrode Density>

The negative electrode according to aspects of the invention has the coated electrode density of preferably not less than 1.10 g/cm$^3$ and more preferably not less than 1.20 g/cm$^3$, but preferably not more than 2.00 g/cm$^3$ and more preferably not more than 1.90 g/cm$^3$.

The coated electrode density of the negative electrode is determined as described below.

A negative electrode having been punched out to have a given area is subjected to measurements of mass (with use of an electronic balance) and a thickness (with use of a micrometer). Subsequently, 10 pieces of current collector having been punched out to have the same area are subjected to measurement of mass, and their average value is treated as the mass of the current collector. Moreover, the thickness of the current collector is determined from the density of metal constituting the current collector. The coated electrode density of the negative electrode is then determined according to the following equation.

Coated electrode density of negative electrode=(mass of negative electrode−mass of current collector)/{(thickness of negative electrode−thickness of current collector)×(punched out area)}

[Lithium Ion Secondary Battery]

A lithium ion secondary battery according to aspects of the invention includes the negative electrode according to aspects of the invention.

The lithium ion secondary battery according to aspects of the invention includes components such as a positive electrode and a non-aqueous electrolyte in addition to the negative electrode according to aspects of the invention. The lithium ion secondary battery according to aspects of the invention is composed of, for example, a negative electrode, a non-aqueous electrolyte and a positive electrode superposed in this order and accommodated in an exterior material.

The type of the lithium ion secondary battery according to aspects of the invention can be arbitrarily selected from a cylindrical type, a square type, a coin type, a button type and other types, depending on the intended use, the device to which the battery is to be mounted, the required charging-discharging capacity, or the like.

<Positive Electrode>

For a material of the positive electrode (positive electrode active material), a material that can absorb and store as well as release lithium in a sufficient amount is preferably selected. Examples of a positive electrode active material include, in addition to lithium, a lithium-containing compound such as a lithium-containing transition metal oxide, a transition metal chalcogenide, a vanadium oxide or a lithium compound thereof; a Chevrel phase compound expressed by Formula $M_xMo_6S_{8-Y}$ (where M represents at least one transition metal element, X is a numerical value in the range of $0 \leq X \leq 4$, and Y is a numerical value in the range of $0 \leq Y \leq 1$); activated carbon; and activated carbon fiber. The vanadium oxide is expressed by $V_2O_5$, $V_6O_{13}$, $V_2O_4$ or $V_3O_8$.

The lithium-containing transition metal oxide is a composite oxide of lithium and a transition metal, and lithium and two or more kinds of transition metals may be mixed to form a solid solution as the lithium-containing transition metal oxide. A single composite oxide may be used alone, or two or more composite oxides may be used in combination.

The lithium-containing transition metal oxide is specifically expressed by $LiM^1_{1-X}M^2_XO_2$ (where $M^1$ and $M^2$ represent at least one transition metal element, and X is a numerical value in the range of $0 \leq X \leq 1$) or $LiM^1_{1-Y}M^2_YO_4$ (where $M^1$ and $M^2$ represent at least one transition metal element, and Y is a numerical value in the range of $0 \leq X \leq 1$).

The transition metal element represented by $M^1$ and $M^2$ may be Co, Ni, Mn, Cr, Ti, V, Fe, Zn, Al, In or Sn, with Co, Ni, Fe, Mn, Ti, Cr, V and Al being preferred. Preferred specific examples include $LiCoO_2$, $LiNiO_2$, $LiMnO_2$, $LiNi_{0.9}Co_{0.1}O_2$, and $LiNi_{0.5}Co_{0.5}O_2$.

Using, for example, lithium, an oxide of a transition metal, a hydroxide of a transition metal, and a salt of a transition metal as starting materials, the lithium-containing transition metal oxide is obtained by mixing the starting materials according to the composition of the desired metal oxide and baking the mixture in an oxygen atmosphere at temperature of 600 to 1,000° C.

As the positive electrode active material, any of the foregoing compounds may be used alone, or two or more thereof may be used in combination. For instance, a carbonate such as lithium carbonate can be added to the positive electrode. When the positive electrode is formed, various additives including an electrically conductive agent and a binder that are conventionally known can be suitably used.

The positive electrode is prepared by, for example, coating both surfaces of a current collector with a positive electrode mixture comprising a positive electrode active material, a binder, and an electrically conductive agent for imparting electrical conductivity to the positive electrode, thereby forming a positive electrode mixture layer.

As the binder, a binder used in preparation of a negative electrode can be used.

As the electrically conductive agent, a conventionally known electrically conductive agent such as a graphitized substance or carbon black is used.

The shape of the current collector is not particularly limited, and examples thereof include a foil-like shape and a net-like shape. The material of the current collector is aluminum, stainless steel, nickel or the like. The current collector preferably has a thickness of 10 to 40 µm.

As with the negative electrode, the positive electrode may be prepared by applying the positive electrode mixture in a paste form to the current collector, drying the applied positive electrode mixture, and performing compression bonding such as press pressurization.

<Non-Aqueous Electrolyte>

The non-aqueous electrolyte may be a liquid non-aqueous electrolyte (non-aqueous electrolytic solution), or a polyelectrolyte such as a solid electrolyte or a gel electrolyte.

As the non-aqueous electrolyte, use is made of a lithium salt which is an electrolyte salt used for an ordinary non-aqueous electrolytic solution, such as $LiPF_6$, $LiBF_4$, $LiAsF_6$, $LiClO_4$, $LiB(C_6H_5)$, LiCl, LiBr, $LiCF_3SO_3$, $LiCH_3SO_3$, $LiN(CF_3SO_2)_2$, $LiC(CF_3SO_2)_3$, $LiN(CF_3CH_2OSO_2)_2$, $LiN(CF_3CF_2OSO_2)_2$, $(HCF_2CF_2CH_2OSO_2)_2$, $LiN((CF_3)_2CHOSO_2)_2$, $LiB[\{C_6H_3(CF_3)_2\}]_4$, $LiAlCl_4$, or $LiSiF_6$. From the oxidative stability point of view, $LiPF_6$ and $LiBF_4$ are preferred.

The electrolyte salt concentration in the non-aqueous electrolytic solution is preferably 0.1 to 5.0 mol/L and more preferably 0.5 to 3.0 mol/L.

Examples of a solvent used to prepare the non-aqueous electrolytic solution include a carbonate such as ethylene carbonate, propylene carbonate, dimethyl carbonate or diethyl carbonate; an ether such as 1,1- or 1,2-dimethoxyethane, 1,2-diethoxyethane, tetrahydrofuran, 2-methyltetrahydrofuran, γ-butyrolactone, 1,3-dioxolan, 4-methyl-1,3-dioxolan, anisole, or diethyl ether; a thioether such as sulfolane or methyl sulfolane; a nitrile such as acetonitrile, chloronitrile or propionitrile; and an aprotic organic solvent such as trimethyl borate, tetramethyl silicate, nitromethane, dimethylformamide, N-methylpyrrolidone, ethyl acetate, trimethyl orthoformate, nitrobenzene, benzoyl chloride, benzoyl bromide, tetrahydrothiophene, dimethylsulfoxide, 3-methyl-2-oxazolidone, ethylene glycol, or dimethyl sulfite.

When the non-aqueous electrolyte is a polyelectrolyte such as a solid electrolyte or a gel electrolyte, a polymer gelated with a plasticizer (non-aqueous electrolytic solution) as a matrix is preferably used.

As a polymer constituting the matrix, use is suitably made of an ether-based polymer compound such as polyethylene oxide, or a crosslinked compound thereof; a poly(meth) acrylate-based polymer compound; or a fluorine-based polymer compound such as polyvinylidene fluoride, or vinylidene fluoride-hexafluoropropylene copolymer.

The non-aqueous electrolytic solution serving as a plasticizer has an electrolyte salt concentration of preferably 0.1 to 5.0 mol/L and more preferably 0.5 to 2.0 mol/L.

The plasticizer content in the polyelectrolyte is preferably 10 to 90 mass % and more preferably 30 to 80 mass %.

<Separator>

A separator can be also used in the lithium ion secondary battery according to aspects of the invention.

The material of the separator is not particularly limited, and use is made of, for example, woven fabric, non-woven fabric, and a fine porous film made of synthetic resin. Among these, a fine porous film made of synthetic resin is preferred, and in particular a polyolefin-based fine porous film is more preferred in terms of the thickness, film strength, and film resistance. Suitable examples of the polyolefin-based fine porous film include a polyethylene fine porous film, a polypropylene fine porous film, and a composite fine porous film thereof.

EXAMPLES

Aspects of the present invention are specifically described below with reference to examples. However, the invention is not limited to the examples described below.

<Preparation of Coating Agent>

As a coating agent with which graphite particles are coated, novolac-type phenolic resins A to C were prepared as described below.

<<Novolac-Type Phenolic Resin A>>

A mixture a1 was obtained by mixing o-cresol and s-trioxane at a molar ratio of 1/1 (o-cresol/s-trioxane).

Acetic acid was added to the mixture a1, the resulting mixture was heated in nitrogen to 80° C., and a mixture liquid of sulfuric acid and acetic acid was gradually added dropwise to the resulting mixture, whereby a mixture a2 was obtained.

The mixture a2 was stirred at 110° C. for 3 hours and subsequently cooled to obtain a reaction mixture a3.

The reaction mixture a3 was put into a 5 mass % aqueous sodium hydrogen carbonate solution to cause a resin to be generated and precipitated. The precipitate was filtered out, washed with warm water, and thereafter dried by air. The precipitate was further dried under reduced pressure at 110° C. for 16 hours, and then pulverized by means of an impact mill.

In this manner, obtained was the novolac-type phenolic resin A in a powder form (particle diameter $D_{50}$: 34 µm, weight average molecular weight: 2,800, residual carbon ratio: 34 mass %).

<<Novolac-Type Phenolic Resin B>>

A mixture b1 was obtained by mixing p-cresol and s-trioxane at a molar ratio of 1/1 (p-cresol/s-trioxane).

Acetic acid was added to the mixture b1, the resulting mixture was heated in nitrogen to 80° C., and a mixture liquid of sulfuric acid and acetic acid was gradually added dropwise to the resulting mixture, whereby a mixture b2 was obtained.

The mixture b2 was stirred at 110° C. for 3 hours and subsequently cooled to obtain a reaction mixture b3.

The reaction mixture b3 was put into a 5 mass % aqueous sodium hydrogen carbonate solution to cause a resin to be generated and precipitated. The precipitate was filtered out, washed with warm water, and thereafter dried by air. The precipitate was further dried under reduced pressure at 110° C. for 16 hours, and then pulverized by means of an impact mill.

In this manner, obtained was the novolac-type phenolic resin B in a powder form (particle diameter $D_{50}$: 30 µm, weight average molecular weight: 1,550, residual carbon ratio: 23 mass %).

<<Novolac-Type Phenolic Resin C>>

A mixture c1 was obtained by mixing o-cresol and s-trioxane at a molar ratio of 1/1.2 (o-cresol/s-trioxane).

Acetic acid was added to the mixture c1, the resulting mixture was heated in nitrogen to 80° C., and a mixture liquid of sulfuric acid and acetic acid was gradually added dropwise to the resulting mixture, whereby a mixture c2 was obtained.

The mixture c2 was stirred at 110° C. for 3 hours and subsequently cooled to obtain a reaction mixture c3.

The reaction mixture c3 was put into a 5 mass % aqueous sodium hydrogen carbonate solution to cause a resin to be generated and precipitated. The precipitate was filtered out, washed with warm water, and thereafter dried by air. The precipitate was further dried under reduced pressure at 110° C. for 16 hours, and then pulverized by means of an impact mill.

In this manner, obtained was the novolac-type phenolic resin C in a powder form (particle diameter $D_{50}$: 28 μm, weight average molecular weight: 3,800, residual carbon ratio: 38 mass %).

Example 1

The carbonaceous substance-coated graphite particles were prepared and evaluated as described below.
<<Preparation of Graphite Particles>>

A raw material was pulverized under the conditions (pulverization conditions) as shown in Table 1 below and granulated, whereby the graphite particles were obtained. More specifically, flake natural graphite (average particle diameter: 8 μm) as the raw material was sequentially passed through 4 pulverizing apparatuses (Hybridization system manufactured by Nara Machinery Co., Ltd.) that were installed in series. In each pulverizing apparatus, the pulverizing time was 10 minutes, and the circumferential speed of the rotor was 60 m/second.
<<Preparation of Carbonaceous Substance-Coated Graphite Particles>>

To 100 parts by mass of the graphite particles, 3.7 parts by mass of the novolac-type phenolic resin A was added, followed by mixing at 25° C. for 15 minutes using a drum-type mixer, whereby resin-adhered graphite particles were obtained.

The obtained resin-adhered graphite particles were put in a graphite container having a lid and heated with nitrogen flowing at 2 L/min (in a non-oxidizing atmosphere) at 1,200° C. for 3 hours using a tubular furnace, whereby carbonaceous substance-coated graphite particles were obtained.

Each of the physical properties of the obtained carbonaceous substance-coated graphite particles was determined according to the foregoing methods. The results are shown in Table 1 below.
<<Preparation of Negative Electrode>>

To water, 98 parts by mass of the carbonaceous substance-coated graphite particles (negative electrode material), 1 part by mass of carboxymethylcellulose (binder), and 1 part by mass of styrene butadiene rubber (binder) were added, followed by stirring, whereby a negative electrode mixture paste was prepared.

The prepared negative electrode mixture paste was applied over copper foil in a uniform thickness and then dried in vacuum at 90° C., whereby a negative electrode mixture layer was formed. Next, the negative electrode mixture layer was pressurized at a pressure of 120 MPa by hand press. Thereafter, the copper foil and the negative electrode mixture layer were punched out into a circular shape with a diameter of 15.5 mm. A negative electrode adhered to a current collector made of copper foil (coated electrode density: 1.50 g/cm³) was prepared in this manner.

<<Preparation of Positive Electrode>>

A positive electrode comprising $LiCoO_2$ (93 mass %), an electrically conductive agent (4 mass %), and a binder (3 mass %) was used. Flake graphite particles and styrene butadiene rubber were used as the electrically conductive agent and the binder, respectively.
<<Preparation of Battery for Evaluation>>

Figure 4:
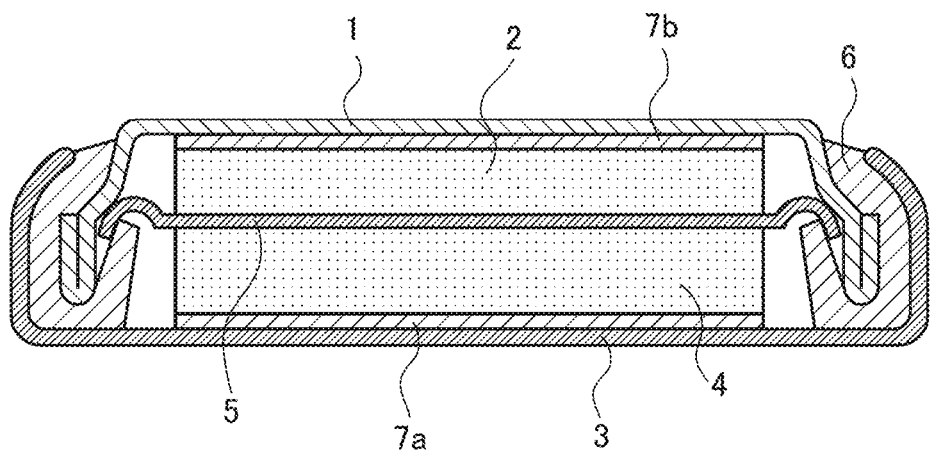
FIG. 4 is a cross-sectional view of a battery for evaluation prepared for battery property evaluation in Examples and Comparative Examples.

As a battery for evaluation, a button-type secondary battery as illustrated in FIG. 4 was prepared.

FIG. 4 is a cross-sectional view of the button-type secondary battery. In the button-type secondary battery illustrated in FIG. 4, circumferential portions of an exterior cup 1 and an exterior can 3 are swaged with an insulating gasket 6 being interposed therebetween, whereby a tightly sealed structure is formed. Inside the tightly sealed structure, a current collector 7a, a positive electrode 4, a separator 5, a negative electrode 2, and a current collector 7b are superposed in this order from the inner surface of the exterior can 3 toward the inner surface of the exterior cup 1.

The button-type secondary battery illustrated in FIG. 4 was prepared as described below.

First, into a mixed solvent comprising ethylene carbonate (33 vol %) and methylethyl carbonate (67 vol %), $LiPF_6$ was dissolved so as to have a concentration of 1 mol/L, whereby a non-aqueous electrolytic solution was prepared. A polypropylene porous body (thickness: 20 μm) was impregnated with the prepared non-aqueous electrolytic solution, whereby the separator 5 impregnated with the non-aqueous electrolytic solution was prepared.

Next, the prepared separator 5 was held between the negative electrode 2 adhered to the current collector 7b made of copper foil and the positive electrode 4 adhered to the current collector 7a made of a nickel net so that they were laminated. Thereafter, the current collector 7b and the negative electrode 2 were accommodated in the exterior cup 1, while the current collector 7a and the positive electrode 4 were accommodated in the exterior can 3, and the exterior cup 1 and the exterior can 3 were put together. In addition, the circumferential portions of the exterior cup 1 and the exterior can 3 were swaged to be tightly sealed, with the insulating gasket 6 being interposed therebetween. The button-type secondary battery was prepared in this manner.

Using the prepared button-type secondary battery (battery for evaluation), the battery properties were evaluated though the charging-discharging test described below. The results are shown in Table 1 below.

In the following charging-discharging test, the process in which lithium ions are absorbed and stored in the negative electrode material is assumed as charging, and the process in which lithium ions are released from the negative electrode material is assumed as discharging.
<<Initial Discharging Capacity>>

Constant-current charging at 0.9 mA was performed, and when the circuit voltage reached 0 mV, the constant-current charging was changed to constant-voltage charging. Charging was further continued until the current value reached 20 μA. Thereafter, the battery was rested for 120 minutes. Next, constant-current discharging at the current value of 0.9 mA was performed until the circuit voltage reached 1.5 V, and based on the amount of carried current during this process, the discharging capacity per unit mass (unit: mAh/g) was obtained. The results are shown in Table 1 below.
<<Charging-discharging test: 25° C. Output Resistivity>>

Constant-current charging at 1.00 was performed in a 25° C. temperature atmosphere until the circuit voltage reached 3.82 V. Thereafter, the atmosphere was adjusted to 0° C. temperature atmosphere, and the button-type secondary battery was rested for 3 hours.

Discharging at 0.5 C was next performed for 10 seconds, followed by a rest of 10 minutes, and charging at 0.5 C was performed for 10 seconds, followed by a rest of 10 minutes.

Next, discharging at 1.00 was performed for 10 seconds, followed by a rest of 10 minutes, and charging at 0.5 C was performed for 20 seconds to have the state of charge (SOC) rate of 50%, followed by a rest of 10 minutes.

Next, discharging at 1.5 C was performed for 10 seconds, followed by a rest of 10 minutes, and charging at 0.5 C was performed for 30 seconds to have the SOC rate of 50%, followed by a rest of 10 minutes.

Next, discharging at 2.0 C was performed for 10 seconds, followed by a rest of 10 minutes, and charging at 0.5 C was performed for 40 seconds to have the SOC rate of 50%, followed by a rest of 10 minutes.

After the test, the discharging capacity (unit: mAh) obtained as above was multiplied by the respective C rates (0.5 C, 1.0 C, 1.5 C, and 2.0 C), whereby the current values were calculated. In addition, a voltage (10-second value) when discharging was performed at each of the C rates was determined.

The results at the respective C rates were plotted having the current value as the x coordinate and the voltage as the y coordinate, and the inclination of the straight line of linear approximation of these results was calculated through least square. The inclination was treated as the output resistivity (unit: Q). When this value is smaller, the output characteristics can be rated as more excellent.

Furthermore, the 25° C. output resistivity (unit: %) of each example (Examples and Comparative Examples) was obtained from the following equation. The results are shown in Table 1 below.

25° C. output resistivity [%]=(output resistivity of each example/output resistivity of Example 1)×100

Example 2

To 100 parts by mass of the graphite particles, 13.0 parts by mass of the novolac-type phenolic resin B was added. Except this change, carbonaceous substance-coated graphite particles were prepared in the same manner as in Example 1, and were evaluated. The results are shown in Table 1 below.

Example 3

To 100 parts by mass of the graphite particles, 3.9 parts by mass of the novolac-type phenolic resin C was added. Except this change, carbonaceous substance-coated graphite particles were prepared in the same manner as in Example 1, and were evaluated. The results are shown in Table 1 below.

Example 4

To 100 parts by mass of the graphite particles, 13.7 parts by mass of the novolac-type phenolic resin C was added. Except this change, carbonaceous substance-coated graphite particles were prepared in the same manner as in Example 1, and were evaluated. The results are shown in Table 1 below.

Example 5

The circumferential speed of the rotor of each pulverizing apparatus through which the raw material was passed was 150 m/second, and 16.5 parts by mass of the novolac-type phenolic resin A was added to 100 parts by mass of the graphite particles. Except this change, carbonaceous substance-coated graphite particles were prepared in the same manner as in Example 1, and were evaluated. The results are shown in Table 1 below.

Example 6

The number of the pulverizing apparatuses through which the raw material was passed was three, the circumferential speed of the rotor of each pulverizing apparatus was 50 m/second, and 9.9 parts by mass of the novolac-type phenolic resin A was added to 100 parts by mass of the graphite particles. Except this change, carbonaceous substance-coated graphite particles were prepared in the same manner as in Example 1, and were evaluated. The results are shown in Table 1 below.

Example 7

The number of the pulverizing apparatuses through which the raw material was passed was two, the pulverizing time and the circumferential speed of the rotor of each pulverizing apparatus were 7 minutes and 100 m/second, respectively, and 9.9 parts by mass of the novolac-type phenolic resin A was added to 100 parts by mass of the graphite particles. Except this change, carbonaceous substance-coated graphite particles were prepared in the same manner as in Example 1, and were evaluated. The results are shown in Table 1 below.

Comparative Example 1

The number of the pulverizing apparatuses through which the raw material was passed was one, the circumferential speed of the rotor of the pulverizing apparatus was 70 m/second, and 5.7 parts by mass of the novolac-type phenolic resin B was added to 100 parts by mass of the graphite particles. Except this change, carbonaceous substance-coated graphite particles were prepared in the same manner as in Example 1, and were evaluated. The results are shown in Table 1 below.

Comparative Example 2

The number of the pulverizing apparatuses through which the raw material was passed was eight, the circumferential speed of the rotor of each pulverizing apparatus was 100 m/second, and 9.9 parts by mass of the novolac-type phenolic resin A was added to 100 parts by mass of the graphite particles. Except this change, carbonaceous substance-coated graphite particles were prepared in the same manner as in Example 1, and were evaluated. The results are shown in Table 1 below.

Comparative Example 3

The number of the pulverizing apparatuses through which the raw material was passed was three, the circumferential speed of the rotor of each pulverizing apparatus was 40 m/second, and 9.9 parts by mass of the novolac-type phenolic resin A was added to 100 parts by mass of the graphite particles. Except this change, carbonaceous substance-coated graphite particles were prepared in the same manner as in Example 1, and were evaluated. The results are shown in Table 1 below.

Comparative Example 4

To 100 parts by mass of the graphite particles, 15.0 parts by mass of coal-tar pitch was added, the resultant was heated to 50° C. and mixed by a biaxial kneader for 30 minutes, and thereafter heated with nitrogen flowing at 5 L/minute (in a non-oxidizing atmosphere) at 1,100° C. for 10 hours using a tubular furnace, whereby carbonaceous substance-coated graphite particles were obtained. Except this change, the carbonaceous substance-coated graphite particles were prepared in the same manner as in Example 1, and were evaluated. The results are shown in Table 1 below.

Comparative Example 5

The number of the pulverizing apparatuses through which the raw material was passed was one, the circumferential speed of the rotor of the pulverizing apparatus was 70 m/second, and 20.0 parts by mass of the novolac-type phenolic resin A was added to 100 parts by mass of the graphite particles. Except this change, carbonaceous substance-coated graphite particles were prepared in the same manner as in Example 1, and were evaluated. The results are shown in Table 1 below.

TABLE 1

| | | Examples | | | | | |
|---|---|---|---|---|---|---|---|
| | | 1 | 2 | 3 | 4 | 5 | 6 |
| Pulverizing Conditions | Number of pulverizing apparatuses | 4 | 4 | 4 | 4 | 4 | 3 |
| | Pulverizing time [min/apparatus] | 10 | 10 | 10 | 10 | 10 | 10 |
| | Total pulverizing time [min] (=number of pulverizing apparatuses × pulverizing time) | 40 | 40 | 40 | 40 | 40 | 30 |
| | Circumferential speed of rotor [m/sec] | 60 | 60 | 60 | 60 | 150 | 50 |
| | Total pulverizing time × circumferential speed of rotor [m] | 144,000 | 144,000 | 144,000 | 144,000 | 360,000 | 90,000 |
| Coating agent | Type | Novolac-type phenolic resin A | Novolac-type phenolic resin B | Novolac-type phenolic resin C | Novolac-type phenolic resin C | Novolac-type phenolic resin A | Novolac-type phenolic resin A |
| | $D_{50}$ [μm] | 34 | 30 | 28 | 28 | 34 | 34 |
| | Weight average molecular weight | 2800 | 1550 | 3800 | 3800 | 2800 | 2800 |
| | Amount of addition [parts by mass] | 3.7 | 13.0 | 3.9 | 13.7 | 16.5 | 9.9 |
| Carbonaceous substance-coated graphite particles | Amount of carbonaceous coatings [parts by mass] | 1.3 | 3.0 | 1.5 | 5.2 | 5.6 | 3.4 |
| | Maximum particle diameter [μm] | 50.0 | 51.5 | 52.4 | 48.9 | 68.5 | 30.5 |
| | Pore volume $V_S$ [cm³/g] | 0.009 | 0.018 | 0.025 | 0.156 | 0.010 | 0.009 |
| | Pore size $P_{max}$ [nm] | 4.1 | 4.2 | 4.0 | 4.3 | 4.1 | 4.3 |
| | Volume ratio of fine grains [%] | 17.5 | 17.2 | 17.2 | 17.8 | 3.5 | 20.5 |
| | Volume ratio of rod-shaped particles [%] | 36.2 | 36.5 | 36.8 | 36.1 | 35.6 | 45.9 |
| Battery properties | Initial discharge capacity [mAh/g] | 356 | 355 | 355 | 356 | 354 | 356 |
| | 25° C. output resistivity [%] | 100.0 | 99.9 | 99.8 | 97.1 | 97.4 | 99.6 |

| | | Examples | Comparative Examples | | | | |
|---|---|---|---|---|---|---|---|
| | | 7 | 1 | 2 | 3 | 4 | 5 |
| Pulverizing Conditions | Number of pulverizing apparatuses | 2 | 1 | 8 | 3 | 4 | 1 |
| | Pulverizing time [min/apparatus] | 7 | 10 | 10 | 10 | 10 | 10 |
| | Total pulverizing time [min] (=number of pulverizing apparatuses × pulverizing time) | 14 | 10 | 80 | 30 | 40 | 10 |
| | Circumferential speed of rotor [m/sec] | 100 | 70 | 100 | 40 | 60 | 70 |
| | Total pulverizing time × circumferential speed of rotor [m] | 84,000 | 42,000 | 480,000 | 72,000 | 144,000 | 42,000 |

TABLE 1-continued

| | | | | | | | |
|---|---|---|---|---|---|---|---|
| Coating agent | Type | Novolac-type phenolic resin A | Novolac-type phenolic resin B | Novolac-type phenolic resin A | Novolac-type phenolic resin A | Coal-tar pitch | Novolac-type phenolic resin A |
| | $D_{50}$ [μm] | 34 | 30 | 34 | 34 | — | 34 |
| | Weight average molecular weight | 2800 | 1550 | 2800 | 2800 | — | 2800 |
| | Amount of addition [parts by mass] | 9.9 | 5.7 | 9.9 | 9.9 | 15.0 | 20.0 |
| Carbonaceous substance-coated graphite particles | Amount of carbonaceous coatings [parts by mass] | 3.4 | 1.3 | 3.4 | 3.4 | 10.0 | 6.8 |
| | Maximum particle diameter [μm] | 31.1 | 51.5 | 95.2 | 29.0 | 50.0 | 50 |
| | Pore volume $V_S$ [cm³/g] | 0.011 | 0.002 | 0.008 | 0.009 | 0.016 | 0.007 |
| | Pore size $P_{max}$ [nm] | 4.2 | 4.1 | 3.9 | 4.4 | 6.5 | 2.2 |
| | Volume ratio of fine grains [%] | 20.8 | 17.8 | 35.0 | 22.5 | 17.9 | 18 |
| | Volume ratio of rod-shaped particles [%] | 55.4 | 56.2 | 15.5 | 58.2 | 36.4 | 55 |
| Battery properties | Initial discharge capacity [mAh/g] | 354 | 355 | 355 | 356 | 354 | 352 |
| | 25° C. output resistivity [%] | 99.9 | 100.8 | 107.9 | 100.3 | 101.2 | 102.3 |

<Summary of Evaluation Results>

As Table 1 above shows, Examples 1 to 7 where the maximum particle diameter was 30.0 to 90.0 μm, the pore volume $V_s$ was 0.009 to 0.164 cm³/g, and the pore size $P_{max}$ was 2.5 to 5.5 nm had better output characteristics than those of Comparative Examples 1 to 5 where at least one of these conditions was not satisfied.

REFERENCE SIGNS LIST

1: exterior cup
2: negative electrode
3: exterior can
4: positive electrode
5: separator
6: insulating gasket
7a: current collector
7b: current collector

The invention claimed is:

1. Carbonaceous substance-coated graphite particles comprising: graphite particles; and carbonaceous coatings covering at least part of surfaces of the graphite particles,
wherein the carbonaceous substance-coated graphite particles have a maximum particle diameter of 30.0 to 90.0 μm,
a pore volume $V_s$ of pores with a pore size of 7.8 to 36.0 nm is 0.009 to 0.164 cm³/g,
in a pore size distribution graph with the pore size being plotted on a horizontal axis and a dV/dP value obtained by differentiating the pore volume with the pore size being plotted on a vertical axis, a pore size $P_{max}$ with which the dV/dP value is maximized is 2.5 to 5.5 nm,
in a particle size distribution of primary particles that is obtained using X-ray computed tomography, a volume ratio of primary particles with an equivalent spherical diameter of not more than 0.8 μm is 3.0 to 21.0%, and
in a particle shape distribution of secondary particles that is obtained using X-ray computed tomography, a volume ratio of rod-shaped secondary particles is 2.6 to 65.0%.

2. The carbonaceous substance-coated graphite particles according to claim 1, wherein an amount of the carbonaceous coatings is 0.1 to 15.0 parts by mass with respect to 100 parts by mass of the graphite particles.

3. The carbonaceous substance-coated graphite particles according to claim 1, wherein the carbonaceous substance-coated graphite particles are used as a negative electrode material for a lithium ion secondary battery.

4. A negative electrode for a lithium ion secondary battery containing the carbonaceous substance-coated graphite particles according to claim 1.

5. A lithium ion secondary battery including the negative electrode according to claim 4.

6. The carbonaceous substance-coated graphite particles according to claim 2, wherein the carbonaceous substance-coated graphite particles are used as a negative electrode material for a lithium ion secondary battery.

7. A negative electrode for a lithium ion secondary battery containing the carbonaceous substance-coated graphite particles according to claim 2.

8. A lithium ion secondary battery including the negative electrode according to claim 7.

* * * * *